United States Patent

Zuel et al.

[11] Patent Number: 5,120,605
[45] Date of Patent: * Jun. 9, 1992

[54] ANTI-REFLECTIVE GLASS SURFACE

[75] Inventors: David C. Zuel, Plymouth; Juei-Hua Lin, New Brighton, both of Minn.

[73] Assignee: Zuel Company, Inc., St. Paul, Minn.

[*] Notice: The portion of the term of this patent subsequent to Jul. 31, 2007 has been disclaimed.

[21] Appl. No.: 500,316

[22] Filed: Mar. 27, 1990

Related U.S. Application Data

[63] Continuation-in-part of Ser. No. 298,332, Jan. 13, 1989, Pat. No. 4,944,986, which is a continuation-in-part of Ser. No. 248,860, Sep. 23, 1988, abandoned.

[51] Int. Cl.⁵ ............................................. C03C 15/00
[52] U.S. Cl. ......................................... 428/410; 65/31; 156/651; 156/663; 428/149; 428/156; 428/426
[58] Field of Search ............... 428/410, 426, 149, 156; 156/651, 663, 638, 639, 644, 637; 65/31

[56] References Cited

U.S. PATENT DOCUMENTS

| | | | |
|---|---|---|---|
| 254,623 | 2/1882 | Bitterlin | 431/240 |
| 276,894 | 5/1883 | Schulze-Berge | 156/635 |
| 1,482,793 | 2/1924 | Hartmann | 501/127 |
| 1,565,869 | 12/1925 | Straw | 156/635 |
| 1,740,376 | 12/1929 | Smith | 252/79.3 |
| 1,760,427 | 5/1930 | Matlock, Jr. | 156/651 |
| 1,772,965 | 8/1930 | Smith | 252/79.3 |
| 1,777,321 | 10/1930 | Meth | 156/663 |
| 1,861,577 | 6/1932 | Mattman | |
| 2,118,386 | 5/1938 | Swinehart | 156/659.1 |
| 2,328,533 | 8/1943 | Walker | 252/79.3 |
| 2,337,460 | 12/1943 | French | 117/124 |
| 2,348,704 | 5/1944 | Adams | 88/1 |
| 2,354,091 | 7/1944 | Sharpe et al. | 41/42 |
| 2,359,072 | 9/1944 | Adams | 41/42 |
| 2,367,704 | 1/1945 | Walker | 88/14 |
| 2,370,214 | 2/1945 | Walker | 41/42 |
| 2,426,541 | 8/1947 | Williams | 41/42 |
| 2,445,238 | 7/1947 | Nicoll et al. | 41/42 |
| 2,446,060 | 7/1944 | Pray et al. | 252/101 |
| 2,461,840 | 2/1949 | Nicoll | 41/42 |
| 2,486,431 | 11/1949 | Nicoll et al. | 41/42 |
| 2,490,263 | 12/1949 | Gaiser et al. | 117/106 |
| 2,490,662 | 12/1949 | Thomsen | 41/42 |
| 2,529,703 | 11/1950 | Nicoll | 41/42 |
| 2,655,439 | 10/1953 | Floersch | 41/42 |
| 2,662,016 | 12/1952 | Gilstrap et al. | 41/42 |
| 2,749,794 | 6/1956 | O'Leary | 88/1 |
| 2,955,927 | 10/1960 | Ogata | 41/42 |
| 2,966,432 | 12/1960 | Buck | 134/41 |
| 2,989,384 | 6/1961 | Allen et al. | 41/42 |
| 2,999,013 | 9/1961 | Meth | 41/42 |
| 3,023,139 | 2/1962 | Tetterode | 156/24 |
| 3,024,148 | 5/1962 | Schaer | 156/17 |
| 3,046,084 | 7/1962 | Veazie | 18/54 |
| 3,107,188 | 10/1963 | Hancock | 156/17 |

(List continued on next page.)

Primary Examiner—Ellis P. Robinson
Assistant Examiner—Archene Turner
Attorney, Agent, or Firm—Darby & Darby

[57] ABSTRACT

A low reflectance glass surface is disclosed which includes a particular combination of surface structures which produce a low reflectance yet high clarity glass. The surface structure includes a plurality of islands distributed at a density of about 60 to 10,000 islands per square millimeter. The glass surface also includes a skeletalized silica structure of 200 to 600 angstroms in diameter, uniformly distributed over the surface. By combining the various surface structures on one piece of glass, unique properties of low reflectance yet high clarity are provided, which is particularly suitable for use in picture frames where any distortion would distract from viewing a picture contained therein and also in computer or t.v. screens where distortion or glare could produce operator fatigue or stress. The glass structure is achieved by a process which is readily adaptable to existing production lines without requiring major modifications. Consequently, the low glare high clarity glass can be produced economically, allowing use in applications not previously adaptable to the highly expensive anti-reflection glass previously available.

3 Claims, 6 Drawing Sheets

U.S. PATENT DOCUMENTS

| | | | |
|---|---|---|---|
| 3,203,884 | 8/1965 | Gruss et al. | 204/140.5 |
| 3,220,899 | 11/1965 | Leonard | 156/23 |
| 3,284,181 | 11/1966 | Harnell et al. | 65/31 |
| 3,294,603 | 12/1966 | Myers | 156/24 |
| 3,310,495 | 3/1967 | Masuda et al. | 252/79.1 |
| 3,326,715 | 6/1967 | Twells | 117/124 |
| 3,374,130 | 3/1968 | Junge et al. | 65/31 |
| 3,374,141 | 3/1968 | Junge et al. | 65/31 |
| 3,383,255 | 5/1968 | Rossi et al. | 156/17 |
| 3,485,687 | 12/1969 | Chapman et al. | 156/4 |
| 3,490,982 | 1/1970 | Sauveniere et al. | 161/1 |
| 3,514,407 | 5/1970 | Missel | 252/79.3 |
| 3,546,037 | 12/1970 | Sulzle | 156/24 |
| 3,551,228 | 12/1970 | Meth | 156/24 |
| 3,560,281 | 2/1971 | Nelson | 156/24 |
| 3,565,707 | 2/1971 | Radimer et al. | 156/3 |
| 3,616,098 | 10/1971 | Falls | 65/31 |
| 3,647,583 | 3/1972 | Johannes | 156/6 |
| 3,712,711 | 1/1973 | Adachi | 350/164 |
| 3,753,815 | 8/1973 | Burton et al. | 156/6 |
| 3,774,130 | 3/1968 | Junge et al. | 161/1 |
| 3,782,915 | 1/1974 | Filbert et al. | 65/30 |
| 3,788,914 | 1/1974 | Gumbelevicius et al. | 156/18 |
| 3,859,222 | 1/1975 | Squillace et al. | 252/79.3 |
| 3,864,111 | 2/1975 | Kemp | 65/31 |
| 3,934,961 | 1/1976 | Itoh et al. | 350/164 |
| 3,997,690 | 12/1976 | Chen | 427/162 |
| 4,019,884 | 4/1977 | Elmer et al. | 65/30 |
| 4,046,619 | 9/1977 | Rice et al. | 156/645 |
| 4,053,351 | 10/1977 | DeForest et al. | 156/661 |
| 4,055,458 | 10/1977 | Niederprum et al. | 156/663 |
| 4,061,486 | 12/1977 | Jahn | 65/31 |
| 4,073,579 | 2/1978 | Deeg et al. | 351/169 |
| 4,080,188 | 3/1978 | Doddato et al. | 65/31 |
| 4,086,074 | 8/1978 | Minot et al. | 65/31 |
| 4,107,388 | 8/1978 | Gambaretto et al. | 428/428 |
| 4,114,983 | 9/1978 | Maffit et al. | 350/164 |
| 4,153,654 | 5/1979 | Maffitt et al. | 264/1 |
| 4,273,826 | 6/1981 | McCollister et al. | 428/336 |
| 4,332,649 | 6/1982 | Sulzle | 204/98 |
| 4,340,276 | 7/1982 | Maffit et al. | 350/164 |
| 4,372,987 | 2/1983 | Ganner et al. | 427/42 |
| 4,379,180 | 5/1983 | Baglin et al. | 427/38 |
| 4,389,233 | 6/1983 | Kurosaki et al. | 65/31 |
| 4,427,488 | 1/1984 | Servais et al. | 156/663 |
| 4,434,191 | 2/1984 | Cook et al. | 427/165 |
| 4,446,171 | 5/1984 | Thomas | 427/160 |
| 4,448,635 | 5/1984 | Kuiken et al. | 156/637 |
| 4,460,621 | 7/1984 | Pearlman | 427/64 |
| 4,462,161 | 12/1985 | Mennemann et al. | 501/59 |
| 4,486,541 | 12/1984 | Gliemeroth et al. | 501/13 |
| 4,505,781 | 3/1985 | Cozac et al. | 156/640 |
| 4,508,834 | 4/1985 | Gliemeroth et al. | 501/73 |
| 4,511,614 | 4/1985 | Greeson et al. | 428/141 |
| 4,528,010 | 7/1985 | Edahiro et al. | 65/18.1 |
| 4,535,026 | 8/1985 | Yoldas et al. | 428/428 |
| 4,545,918 | 10/1985 | Christian | 252/142 |
| 4,554,046 | 11/1985 | Taguchi et al. | 156/637 |
| 4,555,304 | 11/1985 | Sulzle | 156/663 |
| 4,578,100 | 3/1986 | Breininger | 65/60.8 |
| 4,585,514 | 4/1986 | Scallan | 156/631 |
| 4,588,540 | 5/1986 | Kiefer et al. | 264/43 |
| 4,606,747 | 8/1986 | Steinhoff | 65/31 |
| 4,624,729 | 11/1986 | Bresciani et al. | 156/345 |
| 4,636,439 | 1/1987 | Breininger | 428/428 |
| 4,640,699 | 2/1987 | Ohmi et al. | 65/3.15 |

FOREIGN PATENT DOCUMENTS

| | | |
|---|---|---|
| 472170 | 3/1951 | Canada . |
| 1462618 | 1/1977 | United Kingdom . |

ANTI-REFLECTIVE GLASS SURFACE

CROSS REFERENCE TO RELATED APPLICATIONS

This is a continuation-in-part of application Ser. No. 298,332, filed Jan. 13, 1989, now U.S. Pat. No. 4,944,986, which was a continuation-in-part of application Ser. No. 248,860, filed Sept. 23, 1988, now abandoned.

TECHNICAL FIELD

This invention relates to the surface structure of anti-reflective glass and more particularly to a surface structure of glass which has a low reflectance while attaining high clarity. This invention also relates to methods of producing such surface structures of glass.

BACKGROUND

It is known that glass can be treated to reduce glare (reflection) by making use of two different physical phenomena, diffusion and anti-reflection. Diffusion refers to the phenomenon by which reflections of light are broken up in various directions, so that the intensity of the reflections in the direction of a viewer is reduced, but the total hemispherical reflection remains the same, with "diffusion etching" comprising treating a surface to increase the diffusion effect. Glare reduction by diffusion may be achieved by roughening the glass surface using physical or chemical means, e.g., by grinding, sand blasting, or acid etching. Frosted glass is a typical light diffusion material which is usually made by acid etching of the glass surface. However, such frosted glass cannot be used in applications where high clarity is required along with low glare, for example, in picture frames or as a protective surface for a cathode ray (picture) tube in television receivers or as a screen for computer monitors. In these applications, a high level of clarity is required to prevent distortion of the images and colors displayed by a picture, such as a photograph, or to prevent detracting from the visual appreciation of the image. At the same time, it is also desirable and important to reduce glare to prevent reflected light from interfering with observation of the picture or photograph contained therein. Reduction of glare is of particular importance in computer monitors where fatigue or stress may be induced by unwanted reflections. At the same time, image clarity must be maintained to minimize distortion with consequent eye strain from long-term viewing. While various attempts have been made to improve the light transmission qualities of frosted glass, the degree of clarity that has been achieved in such products has not been sufficient to enable them to be used in picture frames or in monitor screens.

Anti-reflection glass makes use of the destructive interference that results when incident light is reflected from an anti-reflection surface of a glass sheet. By trapping the light at particular wavelengths, there is an actual reduction in the total light reflected, including in the direction of the viewer. Such anti-reflection effects are usually achieved by application to the sheet glass surface of one or more layers of a coating, such as, for example, an inorganic metal oxide, which may be deposited by vacuum deposition, sputtering or sol gel deposition. Although producing a glass surface having low glare and good clarity, these anti-reflection processes are quite costly, and therefore the treated glass is not economical for use in high-volume applications, such as in picture frames, as a replacement for common glass. Consequently, low glare, high clarity sheet glass has not been generally available for use in these applications due to either poor clarity or high cost.

SUMMARY OF THE INVENTION

It is an object of the present invention to provide a glass sheet or pane having a particular surface structure which yields high clarity and low reflectivity of incident light, while minimizing processing costs.

Another object of the present invention is to provide a process for producing a particular glass surface structure having high clarity and low reflectivity properties at a cost that is competitive with the cost of common glass.

The present invention provides a high clarity, low reflectivity glass having at least one glass surface including a plurality of islands uniformly distributed thereover in a density of 60 to 10,000 islands per square millimeter, each of said islands being about 10 to 200 micrometers in diameter, and a skeletized silica structure having openings of between about 200 to 600 angstroms uniformly distributed thereover.

The process for producing the inventive structure on the surface of a glass generally includes the steps of:

pre-etching at least one surface of a glass sheet with an acid solution to remove a weathered layer;

treating the pre-etched glass with a diffusion etching solution containing a strong fluoride ion agent, a weak fluoride ion agent and a moderator, for a time and at a temperature sufficient to produce a glass surface with a plurality of projections or islands disposed thereover in a density of about 60 to 10,000 islands per square millimeter;

cleansing the treated glass; and treating the diffusion etched glass with an anti-reflection composition for a time sufficient to produce a skeletal silica structure having openings of from 200–600 angstroms uniformly on the glass surface.

BRIEF DESCRIPTION OF THE DRAWINGS

FIGS. 5 through 11 are scanning electron micrographs of a glass surface at various stages of the anti-reflective process of the present invention, including a comparison with a typical diffusion etched surface.

DETAILED DESCRIPTION OF THE PREFERRED EMBODIMENT

The present invention provides an inexpensive but nonetheless effective anti-reflective, low glare, glass product which is particularly useful as a protective cover or shield in picture frames, as a screen for cathode ray tubes or as a window or windshield in residential structures and motor vehicles.

Figure 1:
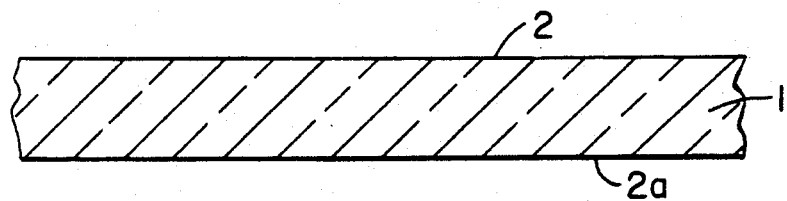
FIG. 1 is a side view of an untreated glass sheet.

FIG. 1 is an illustration of a glass sheet, prior to any treatment according to the present invention. The sheet 1 includes two smooth surfaces 2 and 2a. For ease in illustration, only one surface 2 will be discussed. Of course, one or more surfaces of a glass article may include the surface structure of the present invention. One preferred type of glass usable in the invention is typically termed "soda-lime" glass. In general, soda-lime glass contains a percentage of sodium oxide and calcium oxide dispersed in silicon dioxide (silica), which forms the major component of the glass. Generally, during the etching process, the soda-lime components are dissolved and removed by the etching solution leaving the skeletized glass structure remaining. However, depending on the potency of the etching solution and the duration of the etching treatment, the silica itself may also be dissolved to a certain extent. Soda-lime glasses useful in the invention may contain from 5 to 45 percent by weight of soda-lime with about 20–25 percent by weight soda-lime preferred. While such glasses are preferred for use in the present invention, it will be understood by those skilled in the art that sheets and shapes of various other types of glass well known to the art may be processed to achieve the unique glass structure described herein and to thereby acquire the high clarity/low reflectivity properties taught by the present invention. For example, glasses containing other alkali or mineral oxides such as potassium oxides, barium oxides, strontium oxides and aluminum oxides, with or without a small percentage of lead, may also be used. Also, glasses which have been tempered using conventional tempering treatments yield excellent results when employed as starting materials in the present invention. Consequently, the discussion of soda-lime glass in the instant description of the invention is exemplary and does not limit the scope of the invention thereto.

In order to form the surface structure of the invention on soda-lime glass, a plurality of steps must be undertaken in sequence and under closely controlled conditions. While glass for use in a picture frame or as a monitor screen is the principal application of interest, the anti-reflective glass of the present invention is useful in several applications, including, by way of non-limiting example, windshields for motor vehicles, boats and aircraft, windows for residential and commercial structures, table tops, and other glass structures where high clarity and low reflectance is desired.

The process of the present invention can be used with a glass sheet or other configurations of glass articles, such as curved or multi-faceted glass. However, glass sheets are the most common application. Where only one surface of a glass sheet is to receive the inventive anti-reflective treatment, the opposite surface may be masked or protected from the treating solution by applying a protective coating to the surface prior to contacting of the sheet with any of the treating solutions of the invention. Suitable protective coatings include organic materials not reactive with the treating acid solutions, for example, PVC, polyethylene or polypropylene.

Prior to undergoing any etching, the surface of the glass must be cleaned to remove any oils, greases and any other contaminants which may interfere with the etching process. Any suitable heavy duty industrial glass cleansing solution may be used as a cleansing agent, such as, for example, a 50/50 (volume) solution of ammonia and water. The glass to be treated is generally immersed in the cleaning solution at about 45°–65° C. to assist the cleaning action, with the solution agitated for about 10 minutes. After removal from the cleansing solution, the glass sheet is then rinsed with clean water (at room temperature).

The surface of glass then undergoes a pre-etching step to remove a weathered surface layer which is usually comprised of surface oxides, thereby enhancing wetting with the treatment chemicals. A typical soda-lime glass sheet, including about 23% soda-lime, may be pre-etched in an acid solution comprising about 0.5–12.0% hydrofluoric acid, with 2–4% preferred.

After the pre-etching step, the glass is rinsed with water at about 25° C and thereafter diffusion etched using a diffusion etching solution, the glass treated for between 15 seconds to 25 minutes depending on temperature and concentration. The diffusion etching solution should include a strong fluoride ion agent, such as hydrogen fluoride, a weak fluoride ion agent, such as ammonium bifluoride or ammonium fluoride, combined with a moderator which controls the activity of the fluoride ions in solution. The moderator may be an organic hydroxy group or an "—OR" group containing compound, including at least one hydroxy or "—OR" group where R equals $C_kH_{2k+1}$, and k is any integer which produces a water soluble moderator. For example, compositions may be used which have the formula $C_lH_mO_n$ where l is an integer from 2–12, m is an integer from 4–26 and n is an integer from 2–12, this compound including from 1–12 hydroxy groups or "—OR" groups. Also, compounds having the following formulas may be used: $C_pH_{2p+2}O_p$, $C_pH_{2p+2}O_{p-1}$, $C_pH_{2p+2}O_{p-2}$, $C_pH_{2p+2}O_{p-3}$, $C_pH_{2p+2}O_{p-4}$, $C_pH_{2p}O_p$, $C_pH_{2p}O_{p-1}$, $C_pH_{2p}O_{p-2}$, $C_pH_{2p-2}O_{p+2}$, $C_pH_{2p-2}O_{p+1}$, $C_pH_{2p-2}O_p$, $C_pH_{2p-2}O_{p-1}$, $C_pH_{2p-2}O_{p-2}$, where p is an integer from 2–12 and where from 1–12 hydroxy groups or "—OR" groups are present. Specific water soluble moderators include sucrose, glucose, xylose, ethylene glycol, glycerol, diethylene glycol dimethyl ether, diethylene glycol diethyl ether, diethylene glycol monobutyl ether, and diethylene glycol monoethyl ether. Sorbitol ($C_6H_{14}O_6$, with 6 hydroxyl groups) is most preferred. Generally, a diffusion etching solution including hydrofluoric acid, ammonium bifluoride and sorbitol is preferred, with an especially preferred solution containing from 30 to 550 milliliters per liter of 70% by weight hydrofluoric acid, 30 to 250 grams per liter of ammonium bifluoride, and about 250 to 850 grams per liter of sorbitol.

A most preferred diffusion etching solution comprises 430 ml/L of 70% hydrofluoric acid, 80 g/L of ammonium bifluoride and 500 g/L of sorbitol, which is applied to the glass, preferably by immersion, for 30 seconds at 20° C. The sorbitol, as moderator, serves to retard the etching effect of the acid constituent. As the amount of sorbitol is increased in the bath, the amount of etching of the glass surface that is achieved in a given time period will be reduced. Similarly, as the quantity of sorbitol is decreased, the etching action of the bath is enhanced.

The glass is treated with the diffusion etching solution generally by immersion of the sheet in the solution, which can be either in a one dip or multi dip operation, with the time per dip ranging from seconds to minutes depending on the concentrations, processing temperatures, and glass to be treated. Generally, it is preferable to utilize multiple dips for providing a finer etched structure with greater uniformity. However, the choice of whether a one-dip or a multi-dip process is used may be determined by the user.

Control of processing temperature is very important to achieving the proper surface structure in the present invention. Generally temperatures of between 0° to 35° C. are preferred for the diffusion etching treatment. While such etching could be carried out above and below this range, below 0° C. the reaction rate is unnecessarily slowed, while above 35° C. the reaction rate may cause more severe etching than desired. Generally, the lower temperatures are preferred because at the lower reaction rates, it takes longer to etch the glass, enhancing control of the etching process and therefore providing a more finely etched surface structure which tends to yield a glass with increased clarity.

Figure 2:
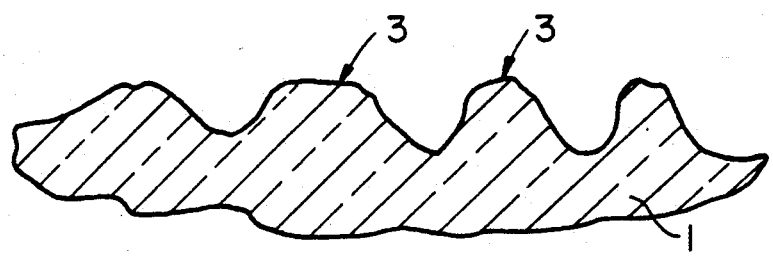
FIG. 2 is an illustrative view of the glass surface structure after diffusion etching treatment according to the present invention.

Referring to FIG. 2, the first stage in diffusion etching is shown. The glass surface 2 has been etched to produce a plurality of islands 3, which are randomly distributed over the glass surface. These islands range from about 10 to 200 micrometers in diameter.

To secure the best anti-reflective characteristics, it is desirable to produce glass surfaces having a plurality of islands, having between about 60 and about 10,000 and preferably 200 to 3,000 and most preferably 250 and 600 islands per square millimeter. The number of islands can be controlled somewhat by varying the time of immersion in the diffusion etching bath. As the immersion time increases, the number of islands increases. The higher density of islands precludes the formation of a scalloped surface. It has also been found that one technique for controlling the density (number of islands per unit area of glass surface) of islands is to vary the concentration of sorbitol within the diffusion etching composition. The number of islands per unit area of glass surface increases as the concentration of sorbitol is increased.

To achieve the described diffusion surface the glass must be treated within relatively precise temperature, time and concentration parameters, as disclosed hereinafter. Examples of various compositions and parameters usable for achieving the described diffusion surface structure are disclosed in Table 1.

TABLE 1

| Bath Parameters | Bath No. 1 | Bath No. 2 |
| --- | --- | --- |
| Hydrofluoric Acid 70% (ml/l) | 40 | 465 |
| Ammonium Bifluoride (g/l) | 150 | 80 |
| Sorbitol (g/l) | 530 | 490 |
| Immersion Time (No. of Dip × Min. per Dip) | 4 × 3 | 1 × 0.4 |
| Temperature (°F.) | 43 | 72 |

After completing the diffusion etching treatment described above, the glass surface to be treated is generally rinsed in an agitated solution of water at 25° C. for 5 minutes and then treated to provide a fine, irregular anti-reflective (AR) structure on the glass surface. Immersion of the glass in the anti-reflection bath creates a skeletal structure consisting of ultra fine pores in the surface of the glass. The ultra fine pores cover the entire surface of the islands, previously created by the diffusion etching step of the present invention, appearing somewhat as an interconnecting silica network. The ultra fine pores are between 200 and 600 angstroms. While processes are known in the art, for providing AR surfaces, such as vapor deposition, sol gel deposition or sputtering, and all are usable with the invention, it is preferred to produce the AR structure by acid etching. Acid etching treatment offers the advantage of low cost and is readily adaptable to high volume production operations.

To provide the high clarity low reflectance glass of the present invention requires treating the already diffusion etched soda-lime glass with an anti-reflection (AR) acid etching solution. The AR etching solution is prepared by dissolving hydrated silica to saturation in an acid, such as $H_2SO_4$, $HCl$, $HNO_3$, $H_3PO_4$, or in salts of these acids, with a fluoride ion added thereto, as it is essential that some fluoride ion be present. While hydrogen fluoride may be used, it is preferable to utilize fluorosilicic acid as the acid component. After dissolution of the hydrated silica to saturation, the solution is filtered to remove the excess silica.

By immersing the glass in a silica supersaturated fluorosilicic acid solution, the soda and lime components of the glass are preferentially etched much faster than the silica components, thereby forming a skeletal silica structure. Such etching can be controlled to produce a skeletal surface structure having a refractive index of about 1.23 and an optical thickness of about one quarter wavelength of green light. Such a surface will effectively reduce the reflection due to destructive interference. Generally the irregular micropore surface achieved has a purplish-blue to blue color (when viewed in daylight). Of course, the degree of etching can be controlled to adjust the index of refraction and thickness, which of the surface layer, to obtain a general refractive index of 1.21 to 1.32, with 1.22 to 1.24 preferred. The optical thickness, which is defined as physical thickness times the index of refraction of the skeletonized structure, should be between 125 and 200, preferably 138-150 nanometers, with openings of from 200-600 angstroms.

Generally the AR solution must be adjusted to the proper strength for the type of glass to be treated. To determine strength, the solutions are tested and compared by potency, termed "solution potency". The basic solution, for example hydrated silica/fluorosilicic acid, is taken as having a zero potency with a fluoride ion contributor, such as hydrofluoric acid or fluoride salt, added to obtain a positive potency, and a fluoride ion sequestering agent, added to reduce the fluoride ion activity and to attain a negative potency. For example, boric acid may be added to form a boron trifluoride, reducing the fluoride activity of the solution. The units of potency are related to fluoride ion concentration, wherein one milliliter of 1 molar HF per one liter of etching solution increases the potency by one positive unit, while 0.5 ml of 4% boric acid per one liter of etching solution is added to decrease the potency by one negative unit. The potency required will vary depending on the composition of the glass which usually varies from manufacturer to manufacturer. Generally, with soda-lime glass having about 25% soda-lime, the etching potency should be within a range of plus 12 to minus 12, when etched at about 45° C. The optimum potency is determined by immersing a number of glass samples in a series of solutions, adjusted to a range of potency units. The samples are etched for a particular length of time, usually 35 to 50 minutes, with the solution which produces the glass with the best purplish-blue to blue color having the optimum potency. Once known, production treatment baths may be adjusted to the potency of that solution.

The AR etching solution is preferably composed of fluorosilicic acid ($H_2SiF_6$) to about 15% by weight, with hydrated silica added to saturation as previously described and then adjusted for potency. The fluorosilicic acid concentration in the etching solution can be higher or lower than 15% by weight, for example from 5 to 25 percent by weight. At a higher fluorosilicic acid concentration, a shorter time is required for producing the skeletonized layer. The etching temperature may also be adjusted from about 25° to about 80° C. with, again, higher temperatures taking less time to produce the skeletonized structure. However, at the higher temperatures, the acid concentration may vary due to evaporation and the solution is considered less stable for production operations. Examples of processing parameters are listed in Table 2.

TABLE 2

| Bath Parameters | Example No. 1 | Example No. 2 |
|---|---|---|
| Fluorosilicic Acid (% wt) | 15 | 15 |
| Hydrated Silica (g/l) | 12* | 12* |
| Hydrofluoric Acid (ml/l) | 0 | 0 |
| Boric Acid (4% ml/l) | 3 | 8 |
| Potency | −6 | −16 |
| Glass Immersion Time (min) | 46 | 16 |
| Temperature (°C.) | 44 | 60 |

*Dissolved to saturation, excess removed by filtration

Figure 4:
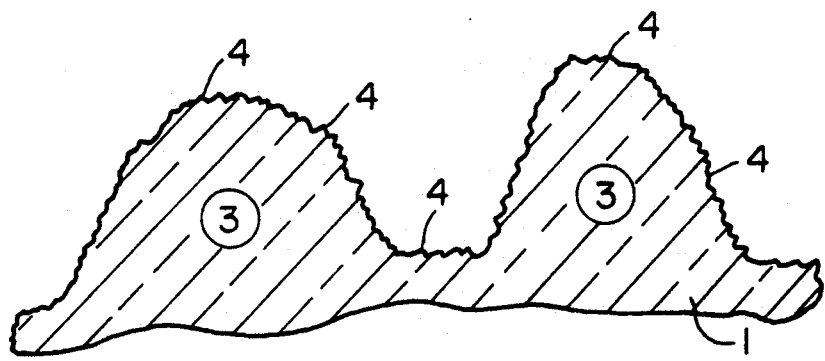
FIG. 4 is an enlarged illustrative view of the glass surface structure after anti-reflectance etching according to the present invention.
Figure 3:
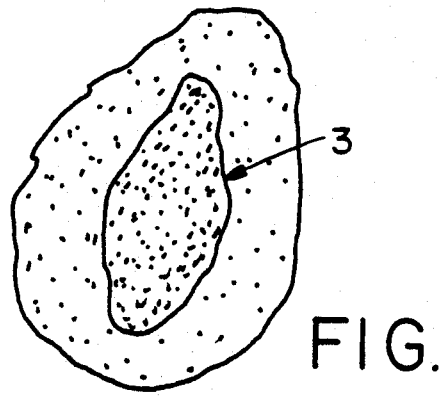
FIG. 3 is a view of a typical island or projection produced on the glass surface.

FIG. 4 illustrates the cross-sectional enlarged view of the glass treated with diffusion etching followed by antireflection etching. The glass 1 includes islands 3. In addition, a silica structure 4 comprising skeletonized silica is integral with the diffusion etched surface. The size of the AR structure is about 200 to 600 angstroms with openings of about the same size. While the precise mechanism is not known, it is believed that the islands which are all larger than the visible wavelengths of light, cause diffusion to occur, without distortion because the density of the structure is low, and because the skeletized silica structure actually reduces the reflection and increses the transmission. This is believed to contribute to the high clarity of the glass. The skeletized silica structure attains an optimum refractive index of 1.23, with lowest reflection occurring at ¼ wavelength of green light. Consequently, a combination structure is achieved which optimizes the reflection properties of the glass while minimizing distortion, providing for high clarity, which is particularly applicable to use of the glass in picture frames or computer monitor screens.

Figure 5:
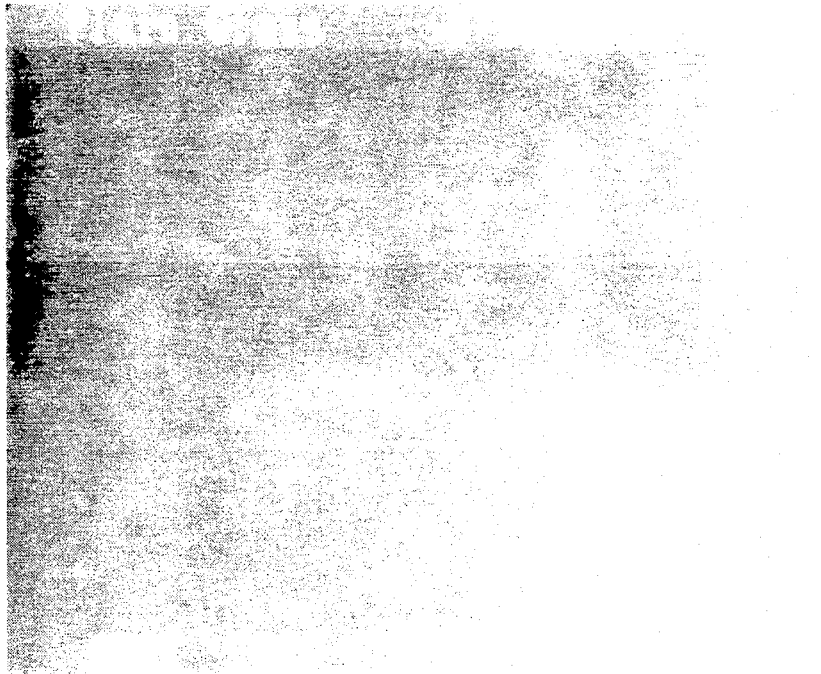
Figure 6:
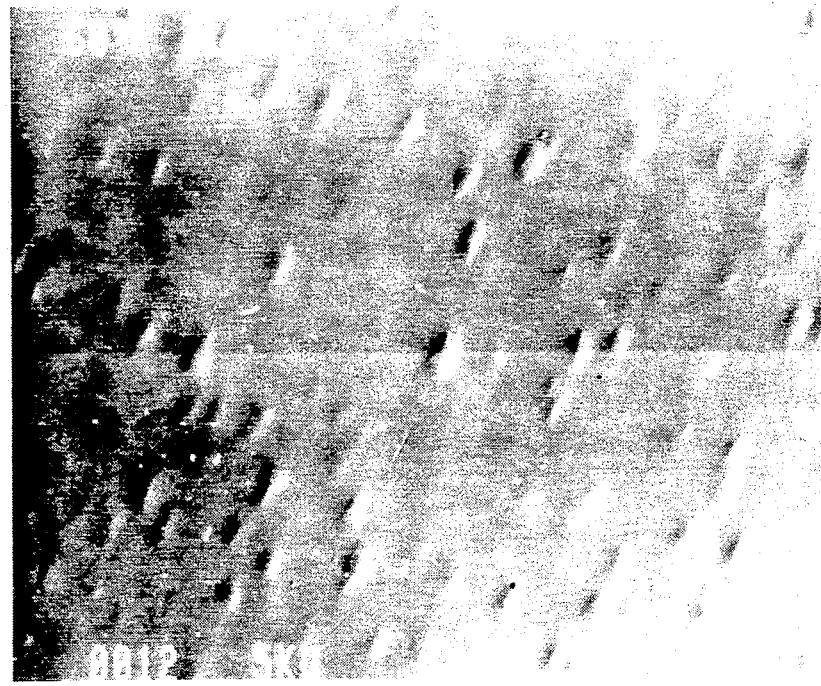
Figure 5:
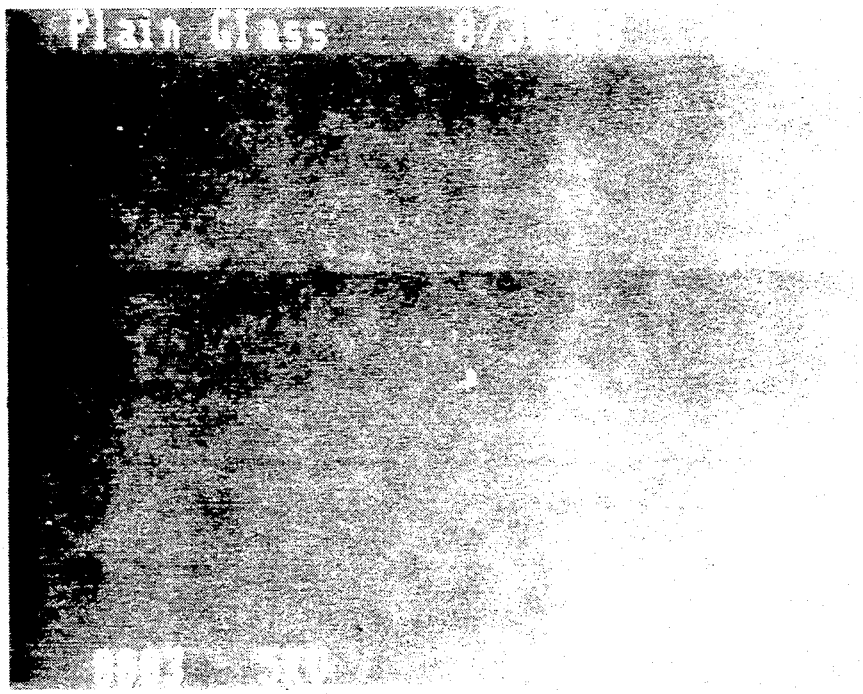
Figure 6:
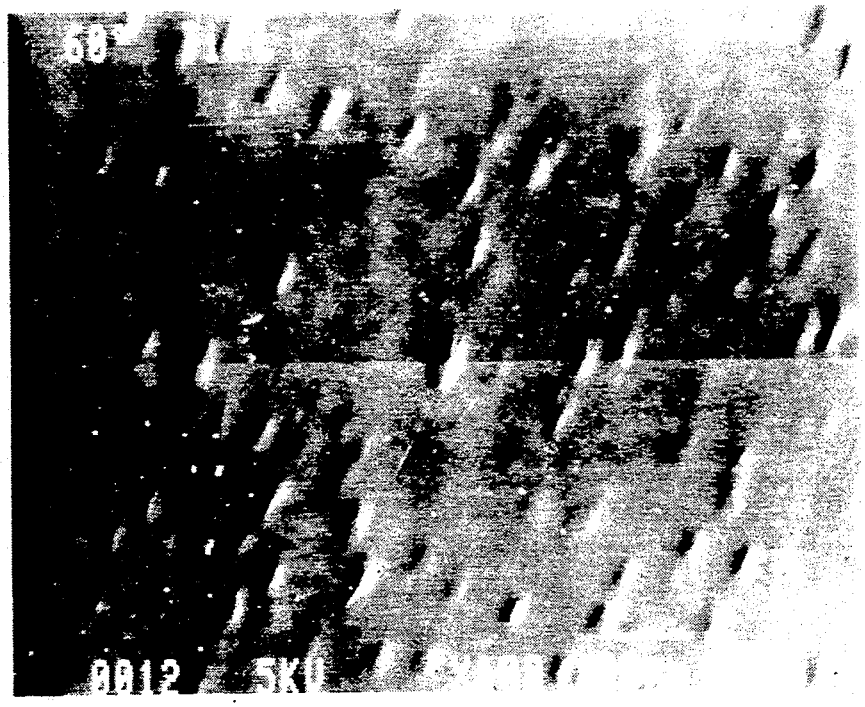

The structures described in the above sections and illustrated in the Figures were confirmed using scanning electron micrograph (SEM) pictures of the glass surfaces at various stages of treatment with the present invention. Referring to FIGS. 5, 6 and 7, SEM photos are shown for a typical soda-lime glass with FIG. 5 illustrating plain glass prior to any treatment, FIG. 6 showing the glass surface after pre-etch and a light diffusion etching only, and FIG. 7 showing a low reflective, high clarity surface structure, as described in copending application Ser. No. 298,332. All three micrographs are taken at 100 X magnification. As can be seen, the plain glass is very smooth compared to the etched glasses. For comparison purposes, a typical diffusion etched glass of the prior art is shown in FIG. 8, which shows a substantially different surface structure.

Figure 9:
Figure 10:
Figure 11:
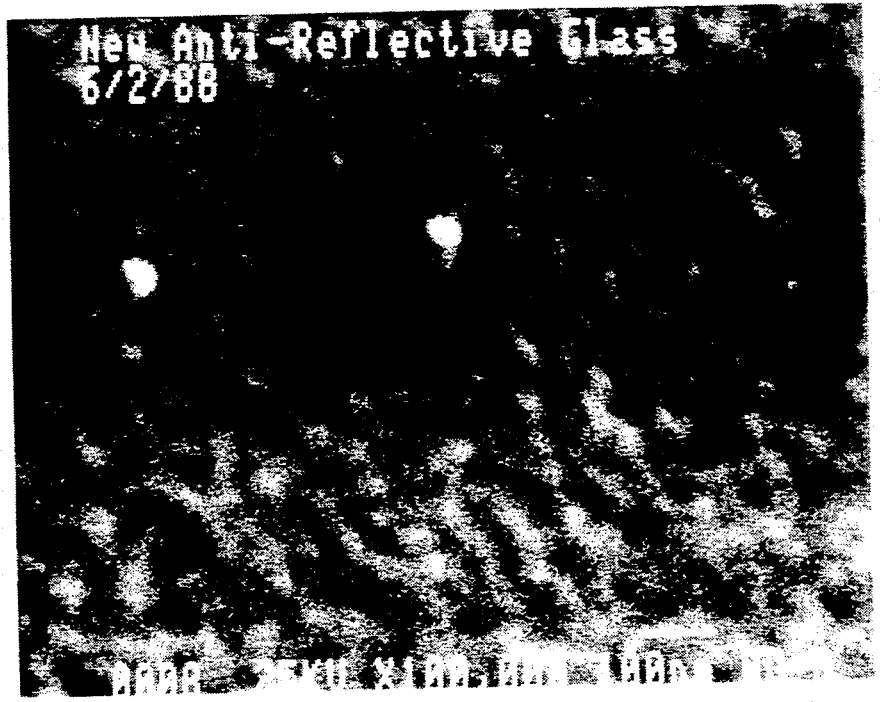

Referring to FIGS. 9 and 10, taken after a light diffusion step, two additional micrographs (500 X magnification) are shown with FIG. 9 illustrating a diffusion surface island without spikes, and FIG. 10 illustrating a diffusion island with spikes. Referring to FIG. 11, a view of a surface structure illustrating the skeletal silica structure across the glass surface is shown using a scanning electron micrograph at 100,000 X. This illustrates the skeletal structure described in FIG. 4.

Figure 12:
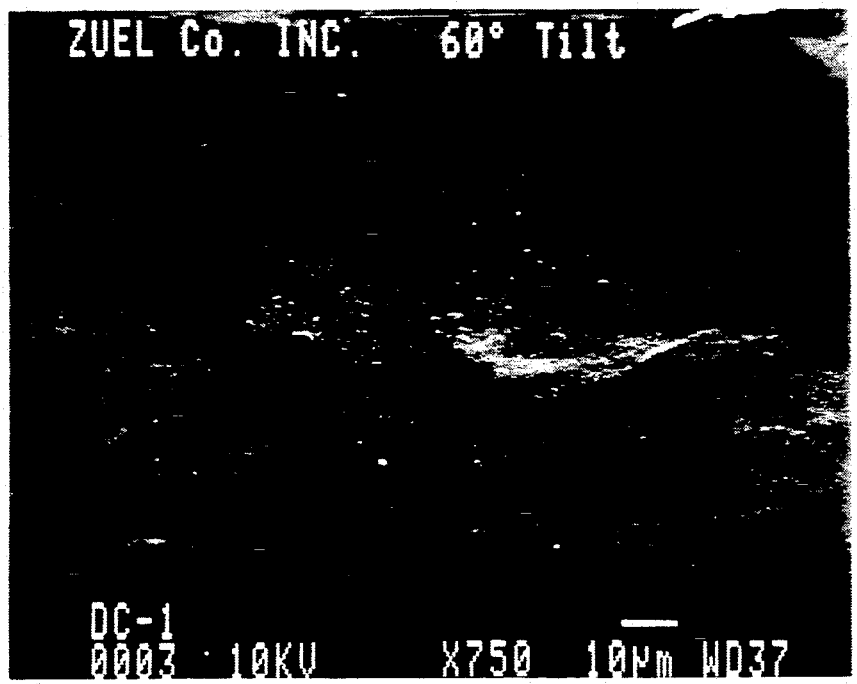
FIGS. 12 and 13 are scanning electron monographs of a diffussion etched glass surface.
Figure 13:
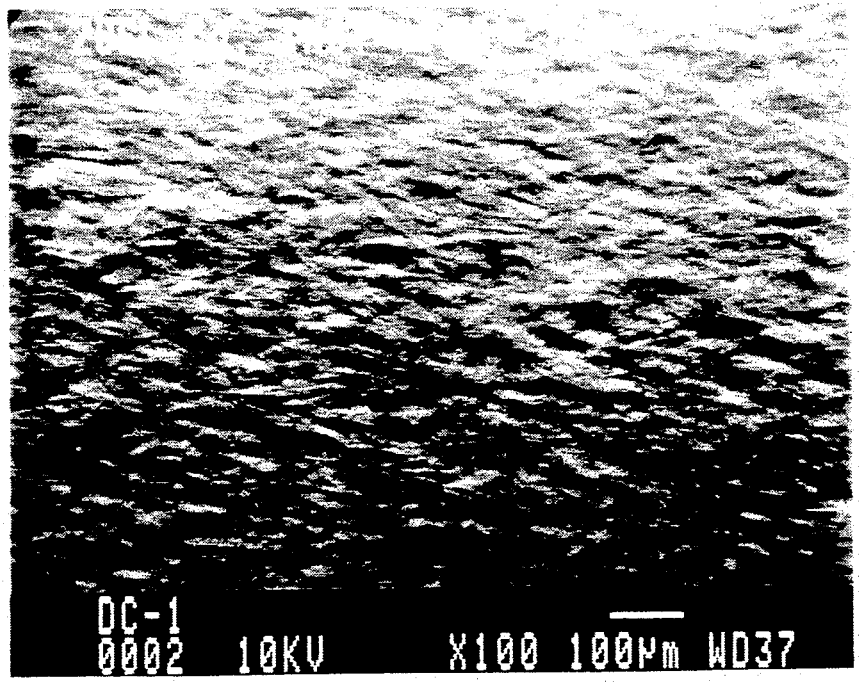

FIGS. 12 and 13 show a glass plate diffusion etched according to the present invention, having an island density of about 560 islands per square milimeter. While substantially rougher than the diffusion etched glass of FIGS. 6 and 9, this glass was found to still provide surprisingly high clarity with low glare after A/R treatment.

EXAMPLE 1

A plate of soda-lime glass having a composition of 14% soda and 9% lime, obtained from PPG Industries, is first cleaned in a pre-etching solution which removes a weathered layer of material from the glass surface. The pre-etching solution consists of 2% by weight hydrofluoric acid, with the glass plate immersed in this solution for two minutes, at room temperature. The glass is then removed from the pre-etched solution and rinsed, preferably with water.

The pre-etched glass plate is then immersed in a diffusion etching solution comprising an aqueous solution including 430 milliliters per liter of 70% hydrofluoric acid, 80 grams per liter of ammonium bifluoride, and 500 grams per liter of sorbitol. The glass is dipped once in the solution at 30 seconds per dip at a temperature of 20° C. The plate is rinsed with water after each dip.

The glass plate is then preheated to 52° C. and thereafter dipped in an anti-reflection etching solution comprising about 15% by weight fluorosilicic acid, with about 12 to 15 grams hydrated silica added, depending on solubility of the silica in the acid, with either hydrofluoric acid or fluoride salt added to obtain a positive potency or boric acid added to obtain a negative potency. The solution used with this example included 3 milliliters of 4% boric acid to obtain a negative potency of 6. The glass was immersed in the anti-reflection etching solution for 46 minutes at a temperature of 45° C. with agitation. The glass was then rinsed, dipped in a neutralizing solution, for example, about 5% sodium hydroxide, to remove any residual acid on the surface and then rinsed and dried.

Glass treated on both surfaces as previously described has a reflectance of 0.5–0.9%, with common glass being 8%, about a 91% change in reflectance. The glass structure of the present invention has a transmittance of about 97%, which is superior to common glass which has a transmittance of about 90.5% (3/32" thick glass sheet). This is due to the AR etching on the glass surface which increases light transmittance.

Utilizing the combination of surface structures including islands and including a skeletized structure of silica thereover, produces a glass sheet which has extremely high clarity with extremely low reflectance with the glass produced in an economic operation. Glass products produced according to the present invention can be used in picture frames, t.v. screens, computer screens and in various other applications where a low reflectance is required combined with high clarity. The glass structures of the present invention are particularly suited for high-volume applications due to the low cost of processing, with particular adaptability for use in picture frames to enhance the ability of a person to view the picture enclosed therein without distortion or glare.

While the preferred embodiments of the present invention have been described in relation to a particular structure produced using a combination of steps, it will be understood by those skilled in the art that various changes or modifications could be made to the processing steps without varying from the scope of the present invention.

What is claimed is:

1. A glass product composed of an alkali or alkaliearth metal silicate glass, the glass product having high optical clarity and including at least one surface comprising a plurality of islands extending across the surface of the glass at a density of 60 to 10,000 islands per square millimeter, and each island being between about 10 to 200 micrometers in diameter, and said islands extending across the entire surface of the glass in such a distribution that said islands contribute to providing decreased reflectance of incident light across said surface of the glass, a skeletized silica structure extending uniformly over the surface of the glass, including said islands, the skeletized structure having openings of about 200 to 600 angstroms uniformly distributed throughout, and said product having low reflectance of incident light.

2. The glass of claim 1 wherein the islands are disposed on the glass surface at a density of 250–600 islands per square millimeter of glass surface.

3. The glass product of claim 1 wherein said product comprises a plane sheet.

* * * * *